United States Patent Office 3,426,022
Patented Feb. 4, 1969

---

3,426,022
2-METHYL-3-PHENYL-4(3H)-PTERIDINONE
Michio Nakanishi and Tetsuya Tahara, Nakatsu, Oita, and Yutaka Maruyama, Tokyo, Japan, assignors to Yoshitomi Pharmaceutical Industries, Ltd., Osaka, Japan
No Drawing. Filed May 25, 1967, Ser. No. 641,143
Claims priority, application Japan, May 28, 1966, 41/34,445
U.S. Cl. 260—251.5                          10 Claims
Int. Cl. C07d 57/28, 99/04

---

ABSTRACT OF THE DISCLOSURE

Pteridinones of the formula

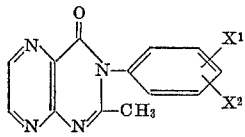

wherein each of $X^1$ and $X^2$ is H, halogen, methyl, methoxy or trifluoromethyl, and wherein $X^1$ and $X^2$ may be the same or different, are useful anti-inflammatory agents.

---

This invention relates to 2-methyl-3-substituted-4(3H)-pteridinones of the formula

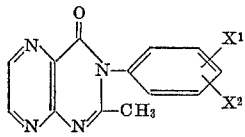
(I)

wherein each of $X^1$ and $X^2$ stands for H, halogen (F, Cl, Br or I), methyl, methoxy or trifluoromethyl, and wherein $X^1$ and $X^2$ may be identical or different.

The pteridinone derivatives (I) are prepared by reacting 3-acetamidopyrazinecarboxylic acid of the formula

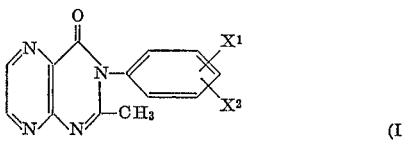

or its dehydrated cyclization derivative, i.e., 2-methyl-4H-pyrazino[2,3-d][1,3]oxazine-4-one, of the formula

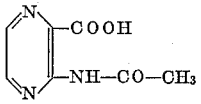

with an amine of the formula

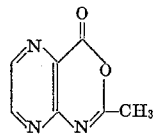

wherein $X^1$ and $X^2$ are as previously defined.

The reaction is more easily carried out in the presence of a dehydrating agent (e.g., phosphorus pentachloride, phosphorus trichloride, phosphorus oxychloride or N,N'-dicylohexylcarbodiimide) at 100–200° C., if desired, in a solvent (e.g., benzene, toluene, tetrahydrofurane, dioxane or ethyl acetate). When dicyclohexylcarbodiimide is used as the dehydrating agent, the reaction can proceed smoothly at ambient temperature. The reaction, when carried out under mild conditions, may give 3-acetamidopyrazine - carboxyanilides as intermediates, which however can be converted into the desired pteridinone derivatives (I) by heating or by treatment with dehydrating agent (see Example 4).

The starting 2-methyl-4H-pyrazino[2,3-d][1,3]oxazine-4-one (yellow scales, M.P. 150–151° C.) can be prepared by reaction of 3-aminopyrazinecarboxylic acid with acetic anhydride (cf. Journal of Medicinal Chemistry, vol. 8, pp. 638–642, September 1965), and 3-acetamidopyrazinecarboxylic acid (pale yellow needles, M.P. 167–168° C. (decomposition)) by dissolving 2-methyl-4H-pyrazino[2,3-d][1,3]oxazine-4-one in water at ambient temperature and then ice-cooling the solution to precipitate the acid.

The pteridinone derivatives of the invention are very useful as anti-inflammatory agents. Tests in rats prove that the pteridinone derivatives can inhibit dextran edema more strongly than oxyphenbutazone can. The new compounds (I) are thus useful in the treatment of inflammatory conditions due to e.g. rheumatic or arthritic, etc., disaffections, and in other cases where oxyphenbutazone is used.

The compounds (I) of the present invention may be administered alone or in combination with pharmaceutically acceptable carriers or may be administered together with aminopyrine or a steroidal anti-inflammatory agent with or without any other pharmaceutically acceptable carriers, the compounds (I) being in any case administrable as powders, tablets, solutions, emulsions, etc. for oral administration or as injections, suppositories, etc. for non-oral administration. The choice of the carrier is determined by the preferred route of administration, the solubility of the compound and standard pharmaceutical practice. In general, the dosage of these compounds of the invention is approximately of a magnitude of 50 milligrams to 1 gram for an adult per day.

The following examples are only for illustrative purposes, and not to be construed as limitations of this invention.

Example 1

To a suspension of 4 grams of 2-acetamidopyrazinecarboxylic acid dissolved in 100 milliliters of toluene, are added 2 grams of aniline and 2 milliliters of phosphorus trichloride (or 2 grams of phosphorus pentachloride or 2 milliliters of phosphorus oxychloride), and the mixture is refluxed for 3 hours. Then the toluene is distilled off to leave a residue, which is poured into 100 milliliters of saturated sodium bicarbonate solution, followed by filtering off the precipitates. The precipitate is recrystallized from ethanol to give 3.2 grams (yield 54%) of 2-methyl-3-phenyl-4(3H)-pteridinone, M.P. 230-232° C.

Example 2

4.5 grams of 2-methyl-4H-pyrazino[2,3-d][1,3]oxazine-4-one and 3.5 grams of p-anisidine are dissolved in 70 milliliters of tetrahydrofurane, and 6 grams of dicyclohexylcarbodiimide are added thereto. The mixture is stirred at ambient temperature for 6 hours. After the resulting precipitate of dicyclohexylurea is filtered off, the filtrate is concentrated, to leave a residue which is recrystallized from ethanol to give 7.1 grams (yield 88%) of 2-methyl-3-p-methoxyphenyl-4(3H)-pteridinone as pale yellow plates melting at 209–211° C.

In analogous manner, the following are also prepared:

2 - methyl-3-o-methylphenyl-4(3H)-pteridinone, white needles, M.P. 184–186° C.;

2 - methyl-3-p-bromophenyl-4(3H)-pteridinone, white needles, M.P. 224–225° C.;

2 - methyl - 3-m-trifluoromethylphenyl-4(3H) - pteridinone, white crystalline powder, M.P. 201–204° C.;

2-methyl-3-2',4'-dimethylphenyl - 4(3H) - pteridinone, white crystalline powder, M.P. 183–184° C.;

2-methyl - 3 - p-chlorophenyl-4(3H)-pteridinone, white crystalline powder, M.P. 190–191° C.; and 2 - methyl - 3 - p - fluorophenyl-4(3H)-pteridinone, white needles, M.P. 233–234° C.

Example 3

A mixture of 2 grams of 2-methyl-4H-pyrazino[2,3-d][1,3]oxazine-4-one and 1 gram of aniline is heated on an oil bath at 150–160° C. for 2 hours. The mixture becomes viscous, but on cooling, solidifies. This is treated with decolorizing charcoal to remove resinous matter therefrom and recrystallized from 60% ethanol to give 0.45 gram (yield about 15%) of 2 - methyl-3-phenyl-4(3H)-pteridinone as white needles melting at 230–232° C.

Example 4

A solution of 5 grams of 2-methyl-4H-pyrazino[2,3-d][1,3]oxazine-4-one and 5 grams of 3,4-dichloroaniline dissolved in 50 milliliters of tetrahydrofurane is stirred at ambient temperature for 30 minutes. The precipitate formed is filtered off to give 9.5 grams (yield 95%) of 3-acetamidopyrazinecarboxy - 3',4'-dichloroanilide (yellow powder, M.P. 120–122° C.).

6 grams of this intermediate is suspended in 50 milliliters of tetrahydrofurane, and 2.5 grams of dicyclohexylcarbodiimide is added thereto. The mixture is stirred at ambient temperature for about 30 minutes. The mixture first becomes transparent, but on further stirring, dicyclohexylurea begins to precipitate. After 5 hours stirring the dicyclohexylurea is filtered off, and the filtrate is concentrated to leave a residue, which is recrystallized from benzene to give 5.2 grams (yield 87%) of 2-methyl-3-3',4'-dichlorophenyl-4(3H)-pteridinone as a white crystalline powder melting at 203–204° C.

Similarly prepared is 3-acetamidopyrazinecarboxy-m-trifluoromethylanilide [M.P.154–155° C. (decomposition)], from which 2-methyl-3-m-trifluoromethylphenyl-4(3H)-pteridinone is derived.

Having thus disclosed the invention, what is claimed is:

1. A compound of the formula

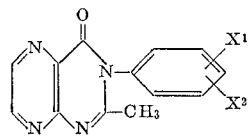

wherein $X^1$ and $X^2$ each is a member selected from the group consisting of H, halogen, methyl, methoxy and trifluoromethyl, and wherein $X^1$ and $X^2$ may be identical or different.

2. A compound according to claim 1, namely, 2-methyl-3-phenyl-4(3H)-pteridinone.

3. A compound according to claim 1, namely, 2-methyl-3-p-fluorophenyl-4(3H)-pteridinone.

4. A compound according to claim 1, namely, 2-methyl-3-p-chlorophenyl-4(3H)-pteridinone.

5. A compound according to claim 1, namely, 2-methyl-3-p-bromophenyl-4(3H)-pteridinone.

6. A compound according to claim 1, namely, 2-methyl-3,3',4'-dichlorophenyl-4(3H)-pteridinone.

7. A compound according to claim 1, namely, 2-methyl-3-o-methylphenyl-4(3H)-pteridinone.

8. A compound according to claim 1, namely, 2-methyl-3-2',4'-dimethylphenyl-4(3H)-pteridinone.

9. A compound according to claim 1, namely, 2-methyl-3-p-methoxyphenyl-4(3H)-pteridinone.

10. A compound according to claim 1, namely, 2-methyl-3-m-trifluoromethylphenyl-4(3H)-pteridinone.

References Cited

UNITED STATES PATENTS 3,361,748   1/1968   Cragoe et al. _____ 260—251.5

NICHOLAS S. RIZZO, Primary Examiner.

R. V. RUSH, Assistant Examiner.

U.S. Cl. X.R.

260—250; 424—251